United States Patent [19]

Senoski

[11] 3,903,801
[45] Sept. 9, 1975

[54] MODEL ROCKET AND RECOVERY DEVICE THEREFOR

[76] Inventor: Walter E. Senoski, 1720 Elderslee Rd., Pittsburgh, Pa. 15227

[22] Filed: July 12, 1973

[21] Appl. No.: 378,595

[52] U.S. Cl............ 102/34.1; 46/86 C; 244/138 A; 416/142
[51] Int. Cl. .... F42b 15/10; A63h 27/00; C06d 1/04
[58] Field of Search ....... 102/34.1, 34.4, 35.4, 35.6, 102/37.1, 37.6, 4; 46/74 A, 86 A, 86 C; 244/138 A; 416/142

[56] References Cited
UNITED STATES PATENTS

| | | |
|---|---|---|
| 2,400,175 | 5/1946 | Suyat .................. 46/86 A |
| 2,684,213 | 7/1954 | Robert et al. ....................... 416/142 |
| 3,098,445 | 7/1963 | Jackson .............................. 102/34.1 |
| 3,795,194 | 3/1974 | Kendrick ........................... 102/34.4 |

*Primary Examiner*—Samuel Feinberg
*Assistant Examiner*—C. T. Jordan
*Attorney, Agent, or Firm*—Parmelee, Miller, Welsh & Kratz

[57] ABSTRACT

A model rocket including novel means for recovering the same after the rocket has spent its fuel and has reached its maximum altitude is provided. The recovery means comprises a foldable rotor assembly which is contained within the rocket body.

5 Claims, 7 Drawing Figures

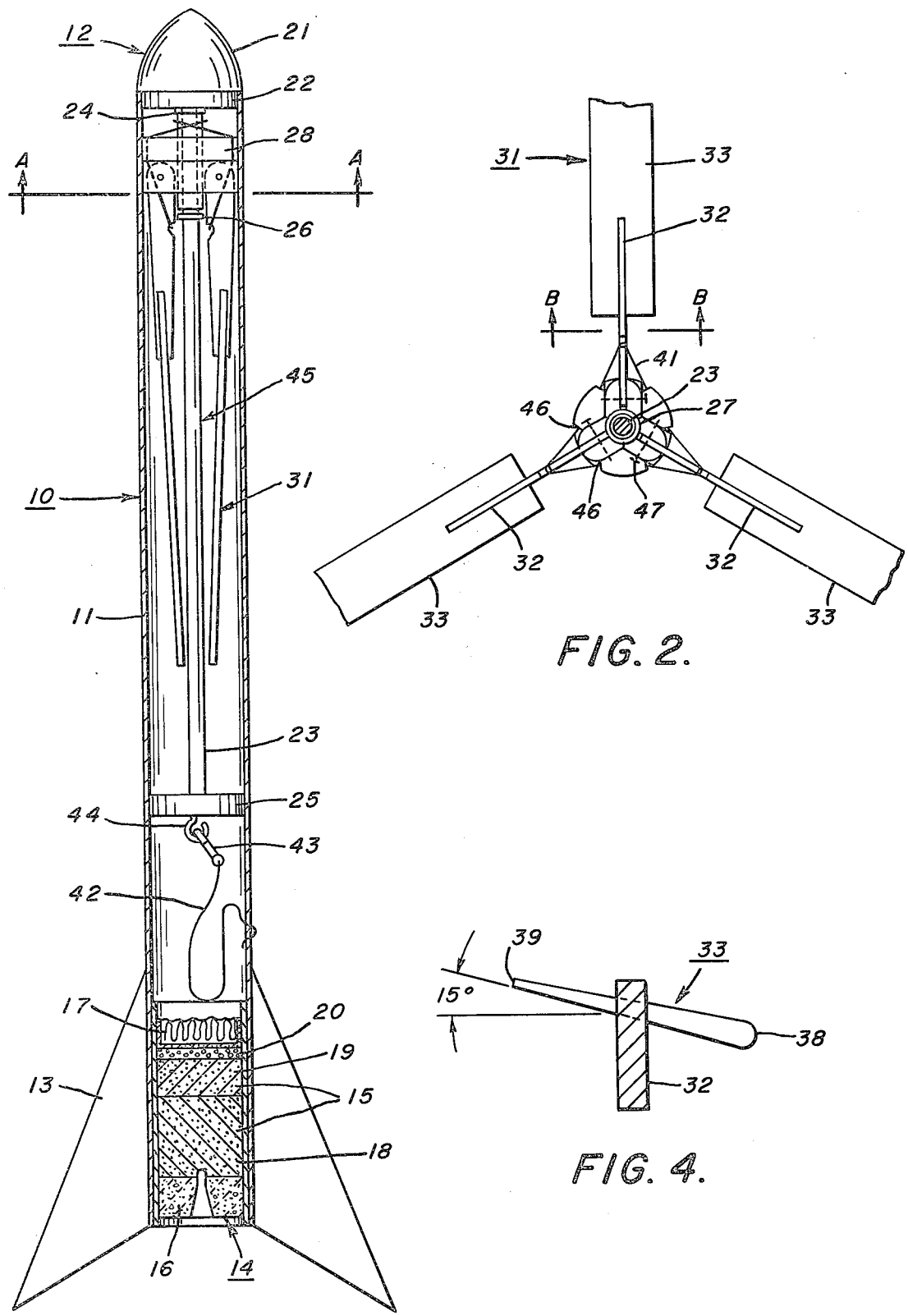

MODEL ROCKET AND RECOVERY DEVICE THEREFOR

BACKGROUND OF THE INVENTION

The advent of the space age has engendered a great deal of interest in model rocketry. Model rockets powered by solid fuel propellant cartridges can easily reach heights of several hundreds of feet. Most model rockets are designed for repeated use and may, barring damage resulting from hard landings, be repeatedly launched simply by replacing the spent propellant cartridge. It is, therefore, desirable to provide means by which the rocket assembly can be recovered at the end of its powered flight with a minimal chance of damaging the assembly.

The most common means of providing for a soft landing for model rockets is to equip the same with a parachute. The parachute is usually contained within the body of the rocket and secured thereto. A blow-out charge in the solid propellant cartridge separates the nose cone from the body of the rocket and ejects the parachute. In many instances the nose cone is also secured to the body of the rocket by a cord or string, thus the parachute provides a safe, convenient means of assuring a soft landing for the entire rocket assembly.

A major drawback to the parachute recovery means is that the same is subject to the vagaries of the prevailing wind. If the rocket attains even moderate altitudes, a light breeze is sufficient to carry the assembly a considerable distance from the launch point. Although this would pose no serious problem in relatively open spaces, it is a disadvantage if only limited open space is available within which to launch and recover the rocket. Moreover, at higher altitudes the amount of drift could be such as to preclude all practical efforts at recovering the assembly, thus resulting in the loss of what is often not an inexpensive device.

BRIEF DESCRIPTION OF THE INVENTION

It is therefore an object of this invention to provide a model rocket and a means of recovering the same after its fuel charge is spent, devoid of the disadvantages accompanying the use of conventional recovery devices such as a parachute or the like. Generally speaking, the invention comprises a solid fuel powered model rocket having a rotor assembly having foldable air foils contained within the rocket body. As the rocket reaches its apogee a blow-out charge in the fuel cartridge ejects the rotor assembly which is secured by a shock cord or the like to the body of the rocket. The foldable air foils deploy to an open configuration and air pressure on the vanes causes rotation of the rotor assembly thus assuring a gentle, substantially vertical descent of the rocket.

DESCRIPTION OF THE DRAWINGS

The following drawings and accompanying detailed description serve to illustrate the preferred embodiments of the invention, but it is to be understood that such drawings and description are intended solely for purposes of illustration and that many variations may be apparent to and may be made therein by those skilled in the art without departing from the spirit and scope of the invention.

FIG. 1 is a side sectional view of a model rocket containing the recovery device of the invention.

FIG. 2 is a plan view taken along the line A—A of FIG. 1, with the rotor blade assembly in open configuration.

FIG. 4 is an end view taken along the line B—B of FIG. 2.

In FIG. 1, 10 generally indicates a typical model rocket having a generally tubular body portion 11, a nose cone 12 and stabilizing fins 13. Folded within the body of the rocket is a rotor assembly 45. The rocket is further provided with a commercially available solid fuel motor 14. The motor 14 usually comprises a propellant charge 15 compressed against a ring 16 of refractory material. The forward end of the motor is closed by a cap 17. The propellant charge 15 is made of an explosive composition such as black powder or the like, compounded with other materials as is well known in the art so as to burn at any desired rate. The propellant charge is generally formed in three sections, i.e. a first charge 18 of compressed black powder having a high burning rate; a second charge 19 of slow-burning black powder having a burning rate lower than the first charge; and a third or blow-out charge 20. As is well known, the first charge 18 provides the initial or lift-off thrust to the rocket; the second charge 19 boosts the rocket to maximum altitude and the third or blow-out charge 20 provides sufficient energy to eject the nose cone 12 from the body 11.

Figure 3:
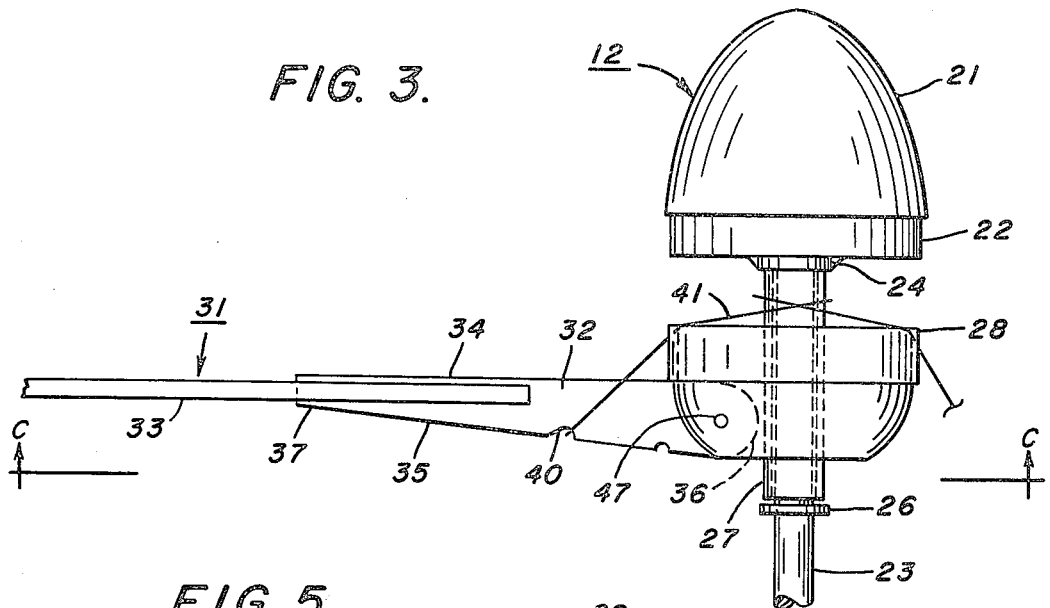
FIG. 3 is an enlarged side sectional view of the rotor assembly of the invention.

Of course, the dimensions of the rocket body 11 and nose cone 12, the dimensions and number of stabilizing fins 13, as well as the dimensions and propellant characteristics of the motor 14 are selected in a manner well known to the model rocket art such that the rocket will attain the desired flight characteristics and such that the nose cone will eject at the desired altitude.

The nose cone 12 consists of an upper or outer portion 21 and a lower or plug portion 22. The upper or outer portion 21 of the nose cone 12 is of any suitable streamlined configuration such as the conical shape shown, having a cross-sectional diameter at least as great as the outside diameter of the tubular body 11. Depending from and coaxial with the top portion 21 is a plug portion 22. The plug portion 22 is generally cylindrical and has a diameter substantially the same as that of the tubular body 11 and is of sufficient length to permit the plug portion 22 to be frictionally engaged in the top of the body portion 11. The fit should be snug but not so snug as to prohibit easy ejection of the nose cone 12 from the body portion 11.

Although the nose cone 12 is described as having two portions 21 and 22, it is generally constructed as a unitary assembly which can be readily molded or cast from suitable material such as plastic or carved from wood.

As shown in FIG. 1, secured to the bottom of the nose cone 12 and coaxial therewith is a rod or shaft 23 having a diameter less than that of the plug 22, the length of the shaft being about one-half to about two-thirds the length of the rocket body 11. A spacer ring 24 coaxial with the shaft 23 is also secured to the bottom of the nose cone 12. The lower end of the shaft 23 is secured to and coaxial with a blow-out piston 25, the piston 25 having a diameter slightly less than that of the body tube 11 such that the piston 25 may move freely when disposed within the body tube.

Figure 5:
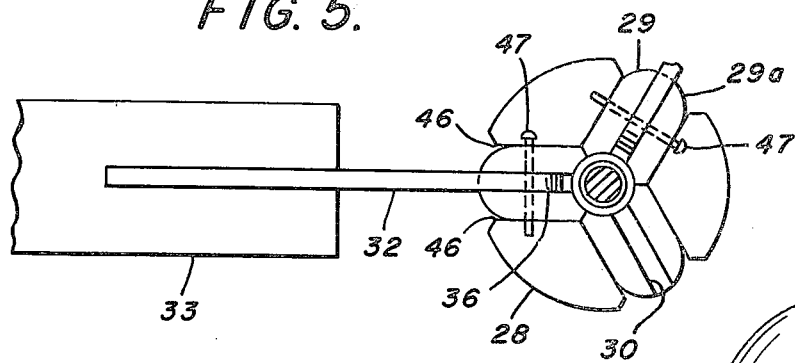
FIG. 5 is a plan view taken along the line C—C of FIG. 3.

With reference to FIG. 3, mounted to and near the upper end of the shaft 23 and coaxial therewith is a retainer ring 26. Between the spacer ring 24 and the retainer ring 26 and coaxial with the shaft 23 is a rotor tube 27 having an inside diameter slightly larger than the shaft 23 such that the rotor tube 27 is rotatable about the shaft 23. Mounted to the rotor tube 27 and coaxial therewith is a rotor mount disc 28, having a cross-sectional diameter less than the inside diameter of the body tube 11. Radially mounted on the underside of disc 28 are hinge pin blocks 29 and 29a as shown in FIG. 5. Each pair of hinge pin blocks 29 and 29a are in spaced substantially parallel relationship to each other so as to define a channel 30 extending from the rotor tube 27 to the periphery of the disc 28. The number of pairs of blocks 29 and 29a depend on the number of rotor blade assemblies 31. In the embodiment shown, there are three rotor blade assemblies 31 and three pairs of blocks 29 and 29a, an angle of about 120° being formed between adjacent radially extending channels 30. If two or four rotor blade assemblies are used, two or four pairs of blocks would be required, the angle between adjacent radially extending channels being 180° or 90° respectively. The outer ends of the blocks 29 and 29a do not extend beyond the periphery of the disc 28 and are preferably beveled to a smooth contour. V-shaped notches 46 are provided in the periphery of the disc 28, there being one such notch on either side of the channel 30, the spacing between the notches 46 and the channel 30 being approximately equal to the width of the blocks 29 and 29a, respectively.

As shown in FIGS. 2 and 3, the rotor blade assembly 31 comprises a blade support 32 and blade 33. The blade support has an upper edge 34 and a lower edge 35 tapered from a rounded inner end 36 to the outer end 37. A slot substantially parallel to the upper edge 34 is provided in the outer end 37 to receive blade 33. The blade 33 has a leading edge 38 and a trailing edge 39 and is preferably pitched at an angle of about 15° to the vertical plane of the blade support 32, each blade being pitched in the same direction as shown in FIG. 4. The lower or tapered edge 35 of the blade support 32 is provided with a notch 40.

The rounded inner end 36 of the blade support 32 is inserted in the channel 30, the top edge 34 of the blade support 32 bearing on the lower surface of the disc 28. A pin 47 is inserted through the faces of the blocks 29 and 29a and through the inner end 36 disposed therebetween of the blade support 32 whereby the blade assembly 31 is pivotally mounted between the blocks 29 and 29a. Resilient means such as an elastic band 41 is looped over the rotor tube 27 engaging the notches 46 on either side of channel 30 and the notch 40 in the lower edge 35 of blade support 32. The elastic band 41 is selected so as to provide tension sufficient to maintain the rotor blade assembly in an open or extended configuration.

As shown in FIG. 1 the blade assemblies 31 are folded downwardly substantially parallel to the shaft 23 for insertion into the upper end of the body tube 11. The blade assembly is restrained from vertically upward movement by the inner surfaces of the tube.

Figure 7:
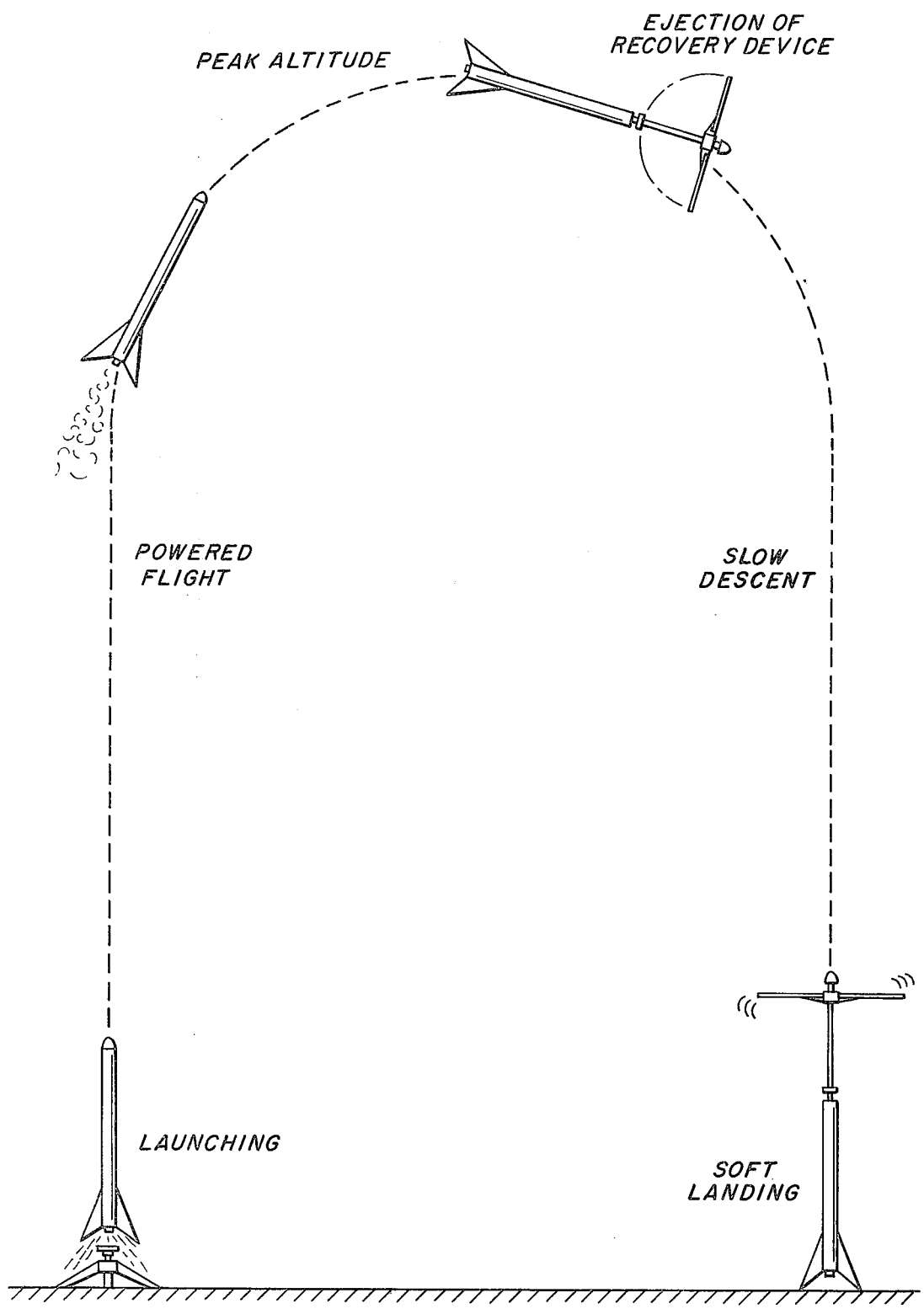
FIG. 7 is illustrative of the operation of the invention in recovering a model rocket.

FIG. 7 is illustrative of the operation of the recovery device of the invention. The motor 14 is ignited by suitable means such as an electric igniter (not shown) and flies upwardly along a substantially vertical path. After the first charge 18 is spent, the rocket continues to coast upwardly powered by the second or booster charge 19. Following burnout of the booster charge, the third or blow-out charge 20 ignites with sufficient energy to eject the recovery device. As the recovery device separates from the rocket body 11, the blade assemblies 31 no longer restrained by the walls of the body tube deploy to an open configuration due to the relaxation of tension on the elastic bands 41. The recovery device is secured to the rocket body 11 by a shock cord 42 one end of which is secured by suitable means to the body tube 11 and the other end preferably attached to a snap swivel 43 which engages a screw eye 44 mounted on the underside of the blow-out piston 25, as shown in FIG. 1.

Air pressure on the blades 33 cause the rotor assembly to rotate around the rod 23 resulting in a helicopter or gyro effect thus assuring a gentle, substantially vertical descent of the rocket.

Figure 6:
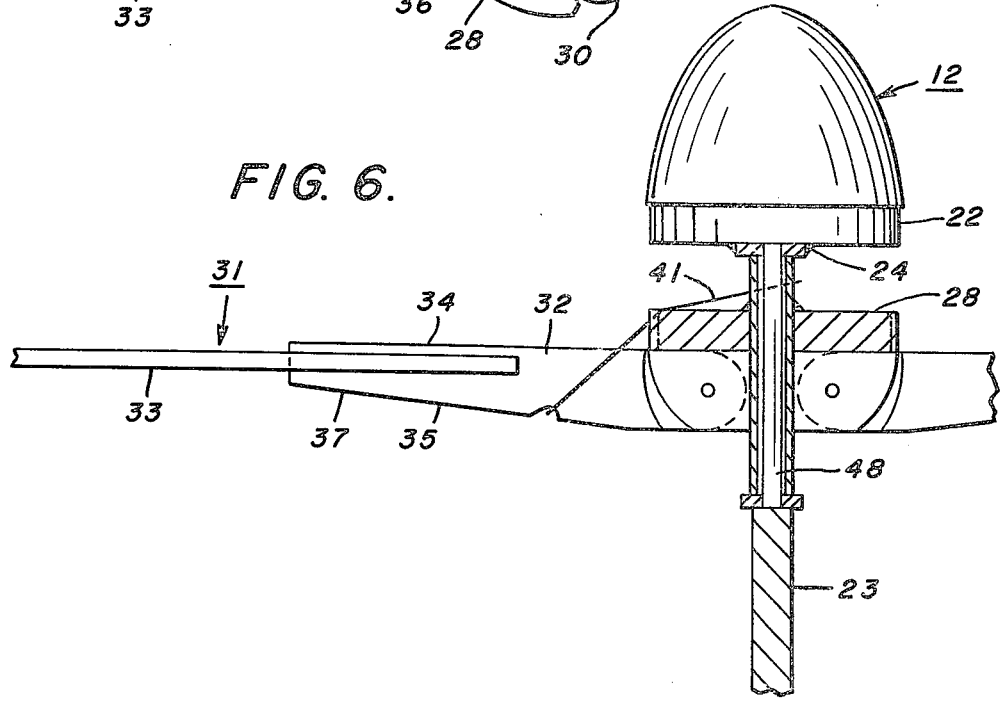
FIG. 6 is a modification of the rotor assembly of FIG. 3.

As shown in FIG. 6, the rotor assembly may be modified so as to rotate at an even higher speed by reducing the diameter of the upper end 48 of the shaft 23.

Both the rocket and the recovery device may be fabricated from any suitable materials known to the scale modeling art such as light-weight woods, plastics and the like. Commercially available scale rockets can also be adapted to accommodate the recovery device of the invention.

What is claimed is:

1. A model rocket comprising a body tube, a motor mounted in the lower end of the body tube, a nose cone frictionally engageable in the upper end of the body tube and recovery means disposed within the body tube, said recovery means comprising:
   a. a shaft, the top end of which is mounted to and coaxial with the underside of the nose cone and the bottom end of which is mounted to and coaxial with a blow-out piston;
   b. a tube coaxial with and rotatable about the upper end of the shaft;
   c. a rotor mount disc fixably mounted to and coaxial with the tube;
   d. a plurality of evenly spaced apart rotor blade assemblies pivotally mounted on the underside of the rotor mount disc whereby when said blade assemblies are in open configuration they are substantially parallel to the horizontal plane of the rotor mount disc and when said blade assemblies are in folded configuration they are substantially parallel to the longitudinal axis of the shaft;
   e. means for elastically biasing said rotor blade assemblies in open configuration; and
   f. a shock cord, one end of which is secured to the underside of the piston and the other end of which is secured to the body tube.

2. The model rocket of claim 1 wherein that portion of the shaft around which is disposed the rotatable tube is of a lesser diameter than the remainder of the shaft.

3. The model rocket of claim 1 having three blade assemblies spaced about 120° apart.

4. The model rocket of claim 1 wherein the blade assembly comprises a blade support and a blade, said blade support having an upper edge and a lower edge tapered from a rounded inner end to an outer end and having a blade receiving slot in the outer end substantially parallel to the upper edge.

5. The model rocket of claim 4 wherein the blade is pitched at an angle of about 15° to the vertical plane of the blade support.

* * * * *